United States Patent [19]
Shuttleworth et al.

[11] 3,951,255
[45] Apr. 20, 1976

[54] CONVEYOR WITH DRIVEN SLIPPABLE ROLLERS

[75] Inventors: James J. Shuttleworth; Carlton S. Sprague, both of Huntington, Ind.

[73] Assignee: Shuttleworth, Inc., Huntington, Ind.

[22] Filed: May 6, 1974

[21] Appl. No.: 467,090

Related U.S. Application Data
[63] Continuation-in-part of Ser. No. 463,680, April 24, 1974, abandoned, which is a continuation of Ser. No. 233,027, March 9, 1972, abandoned.

[30] Foreign Application Priority Data
Feb. 19, 1974  Italy................................... 48470/74

[52] U.S. Cl............................................. 198/127 R
[51] Int. Cl.².......................................... B41J 13/00
[58] Field of Search ............... 198/127 R, 127 E, 89, 198/97, 101, 76; 53/159, 247, 248

[56] References Cited
UNITED STATES PATENTS

| | | | |
|---|---|---|---|
| 1,889,065 | 11/1932 | Gentil................................ | 198/127 |
| 3,337,023 | 8/1967 | Kohl.............................. | 198/127 R |
| 3,344,903 | 10/1967 | Holm ............................ | 198/127 R |
| 3,563,721 | 2/1971 | Ritter................................ | 198/127 |
| 3,650,375 | 3/1972 | Fleischauer..................... | 198/127 R |

Primary Examiner—Richard A. Schacher
Attorney, Agent, or Firm—Woodard, Weikart, Emhardt & Naughton

[57] ABSTRACT

A conveyor for moving objects having driven rollers which slip with respect to the drive shafts extending therethrough. Each drive shaft has a plurality of side-by-side rollers mounted thereon. A pulley is mounted to the end of each drive shaft to receive a belt which is in driving engagement with a main shaft. The main shaft is connected by belts and pulleys to a motor. The rollers may be arranged in different groups having different rotating speeds with an arrangement of rollers provided for moving objects around a corner. A movable roller pan mounted in a case packer is disclosed having the subject rollers.

31 Claims, 22 Drawing Figures

CONVEYOR WITH DRIVEN SLIPPABLE ROLLERS

CROSS REFERENCE TO RELATED APPLICATION

This is a continuation-in-part application of our patent application, Ser. No. 463,680, now abandoned filed Apr. 24, 1974 which is a continuation of application Ser. No. 233,027, now abandoned filed Mar. 9, 1972.

BACKGROUND OF THE INVENTION

1. Field of the Invention

This invention is in the field of conveying devices.

2. Description of the Prior Art

Conveyors are typically used to move objects along different paths such as the path required in a case packing machine. Continuous belts are generally used to convey the objects along the given path. Other conveyors use rotatably mounted rollers which either depend on the force of gravity on the objects to move the objects down the conveyor line or which are positively driven by a motor. Other types of conveyors which utilize positive driven rollers are disclosed in the U.S. Pat. Nos. 3,610,404 and 3,650,375 issued to Fred J. Fleischauer and Theodore A. Hammond and the U.S. Pat. No. 3,563,721 issued to G. F. Ritter, Jr. Other related prior art devices are disclosed in the U.S. Pat. Nos. 1,067,805 to Deischer and 1,889,065 to Gentil.

A problem with the prior art conveyors is that they typically require a relatively large amount of gearing and space such as that found in the continuous belt type of conveyor. The structure typically becomes complex and bulky in the event that the objects are to be driven at different speeds along the length of the conveyor. Disclosed herein is a conveyor which solves these problems and in addition is quieter in respect to the prior art conveyors. In addition, the subject conveyor allows some of the conveyed objects to become stopped such as resulting from jamming while allowing the remaining objects to be freely conveyed.

Typically, transfer plates are utilized between the prior art conveyors. These transfer plates fill the gap between the end of one conveyor and the start of another conveyor. The transfer plates provide dead spots in the conveyors thereby increasing the friction as the objects pass thereacross. The conveyor disclosed herein has relatively small diametered rollers which may be positioned together in such a manner so as to reduce the gap thereby eliminating the need for a transfer plate.

In many instances, it is desirable to move the objects by a conveyor around a corner or through a curve. For example, see the U.S. Pat. No. 871,340 issued to F. C. Hrdina. Side guides are typically needed in the prior art conveyors in order to move the objects around a corner. The conveyor disclosed herein does not require any side guides and instead employs slippable rollers arranged to move the objects around a corner.

SUMMARY OF THE INVENTION

One embodiment of the present invention is a conveyor for moving objects comprising a frame, a plurality of cylindrical rollers mounted to the drive shafts with each shaft having an outside diameter, the rollers having cylindrical interior bearing surfaces of inside diameters enclosing the shafts. At least a portion of each of the interior surfaces contact the outer surfaces of the shafts so rotation of the shafts imparts rotation to the rollers. The inside diameters are greater than the outside diameters allowing the rollers when exteriorly stopped to be stationary while the shafts rotate. A motor is provided for causing the shafts to rotate.

It is an object of the present invention to provide a new and improved quieter conveyor.

It is a further object of the present invention to provide conveying means which conveys objects at different speeds along the lengths thereof.

Another object of the present invention is to provide a conveying means which is mounted on a movable portion of a packing machine.

Yet another object of the present invention is to provide conveying means which eliminate the necessity for transfer plates between adjacent conveyors.

An additional object of the present invention is to provide a conveyor having low line pressure for moving objects with enlarged tops in a stable manner.

In addition, it is an object of the present invention to provide a conveyor which will allow stoppage of a row of objects while adjacent rows continue to move past the stopped row.

Yet a further object of the present invention is to provide an improved conveyor for moving objects around a corner.

Related objects and advantages of the present invention will be apparent from the following description.

DESCRIPTION OF THE PREFERRED EMBODIMENTS

Figure 1:
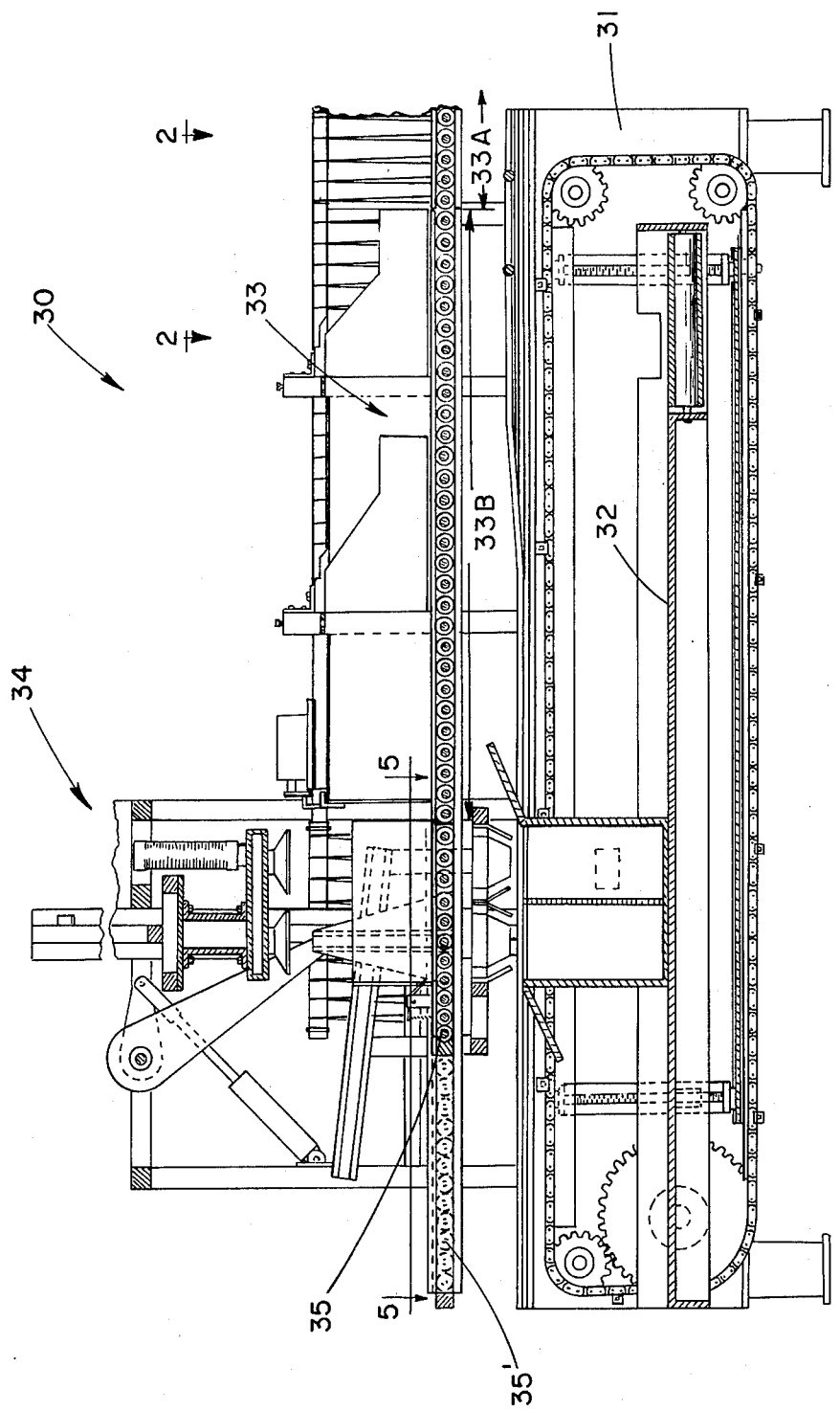
FIG. 1 is a fragmentary cross sectional side view of a case packer incorporating the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIG. 1, there is shown a case packer 30, which includes a frame 31. Mounted upon frame 31 is a box conveyor 32 and a conveying means 33. Boxes are placed on the box conveyor 32 and move inwardly to a position beneath the conveying means 33. The boxes are moved until they reach a position beneath a vertically movable vacuum head 34. The vacuum head 34 functions to lift a pattern of objects from roller pan 35 after the objects have moved from means 33 to pan 35. Vacuum head 34 lifts a pattern of objects from pan 35 which then moves horizontally to dashed line position 35'. Head 34 then moves the objects downwardly into a respective box positioned on the box conveyor 32. FIG. 1 corresponds to FIG. 4 of U.S. Pat. No. 3,386,224 issued to J. J. Shuttleworth with the major exception that a plurality of rollers are used in means 33 and pan 35 in lieu of the conveyor belt shown in the aforementioned patent. Case packer 30 is fully described in U.S. Pat. No. 3,386,224 and the disclosure contained therein is hereby incorporated by reference. Although the new structure disclosed and shown in this specification is incorporated onto case packer 30, it is to be understood that the present invention is not necessarily associated with the prior structure disclosed in the U.S. Pat. No. 3,386,224.

Figure 2:
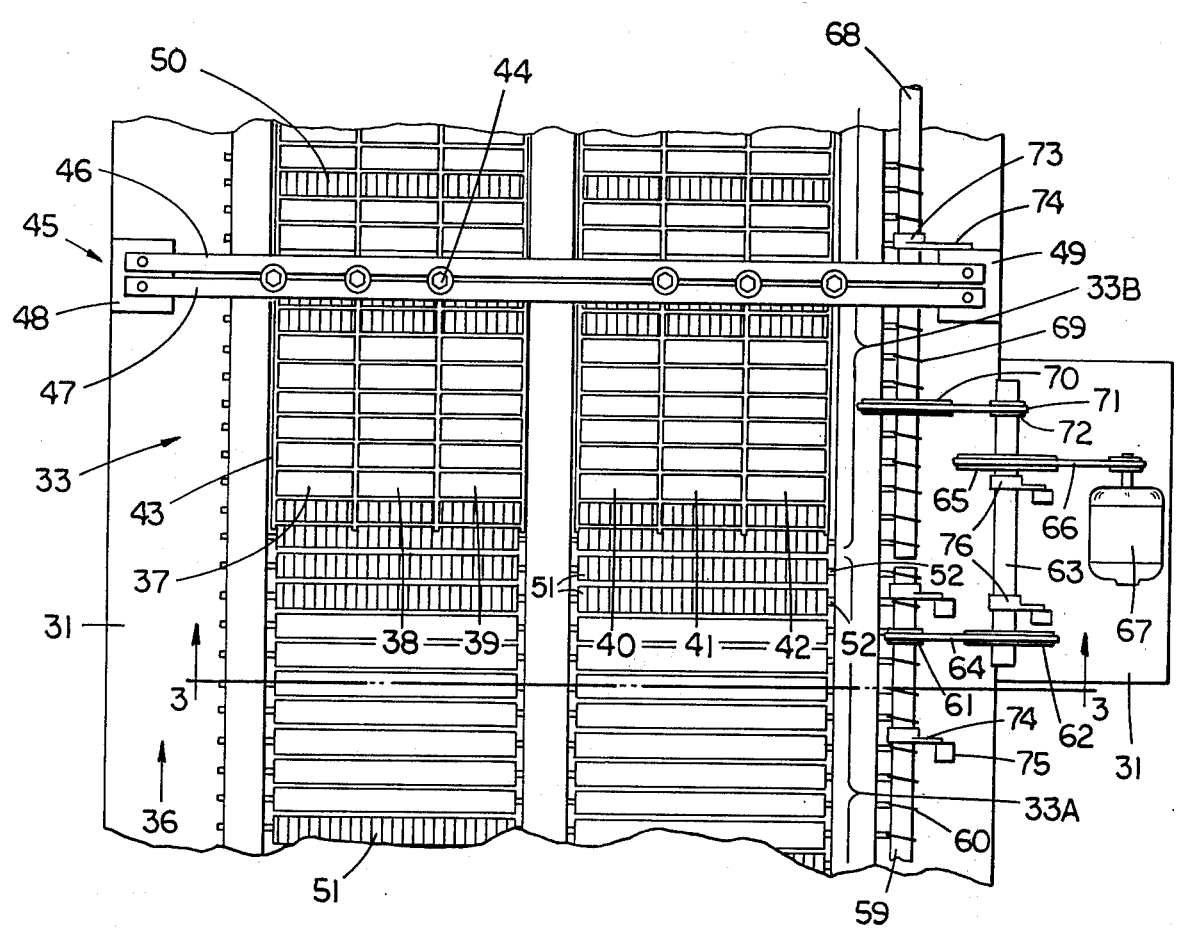
FIG. 2 is an enlarged fragmentary top view of the right portion of the packer shown in FIG. 1 viewed in the direction of arrows 2—2.

FIG. 2 is a fragmentary enlarged top view of conveying means 33 mounted atop frame 31. The objects on conveying means 33 move in the direction of arrow 36 into six separate and parallel rows 37 through 42. The six rows are formed by a plurality of dividing walls 43 which are suspendedly mounted by fasteners 44 to pairs 45 of parallel bars 46 and 47 mounted atop posts 48 and 49 secured to frame 31. Fasteners 44 may be loosened so as to allow adjustment of the divider walls depending upon the size of the moving objects and the number of rows desired.

Figure 4:
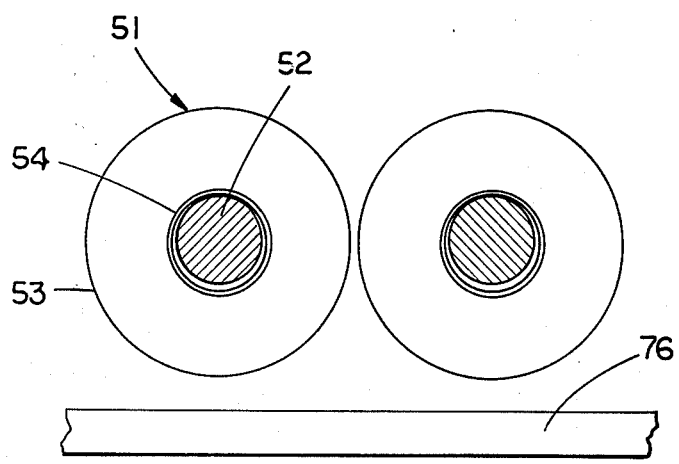
FIG. 4 is an enlarged fragmentary cross sectional view taken along the line 4—4 of FIG. 3 and viewed in the direction of the arrows.

Conveying means 33 includes a plurality of rollers arranged in two groups 33A and 33B. Only some of the rollers have been shown in the drawings for sake of clarity. Dividers 43 extend above but do not contact the rollers in group 33B. The rollers of group 33A feed the objects to the rollers of group 33B and rows 37–42. The rollers 50 in group 33B rotate at a speed less than the rollers 51 in group 33A. Rollers 50 and 51 are identical with the only difference being that rollers 50 rotate at a speed less than rollers 51. Roller 51 will now be described it being understood that rollers 50 are identical in construction. A cross sectional enlarged view of two rollers 51 is shown in FIG. 4. Each roller 51 is rotatably mounted on a metal drive shaft 52 and includes an outer sleeve 53 made from a material such as rubber fixedly mounted onto an inner sleeve 54 made from a plastic material. The inside diameter of sleeve 54 is larger than the outside diameter of shaft 52 thereby allowing the roller to freely rotate on the shaft. In one embodiment, shaft 52 was produced from stainless steel having an outside diameter of ¼ inch. In this same embodiment, inner sleeve 54 had an inside diameter of approximately 17/64 inches and was made from a material such as a form of nylon such as sold under the trademark "NYLATRON".

Figure 3:
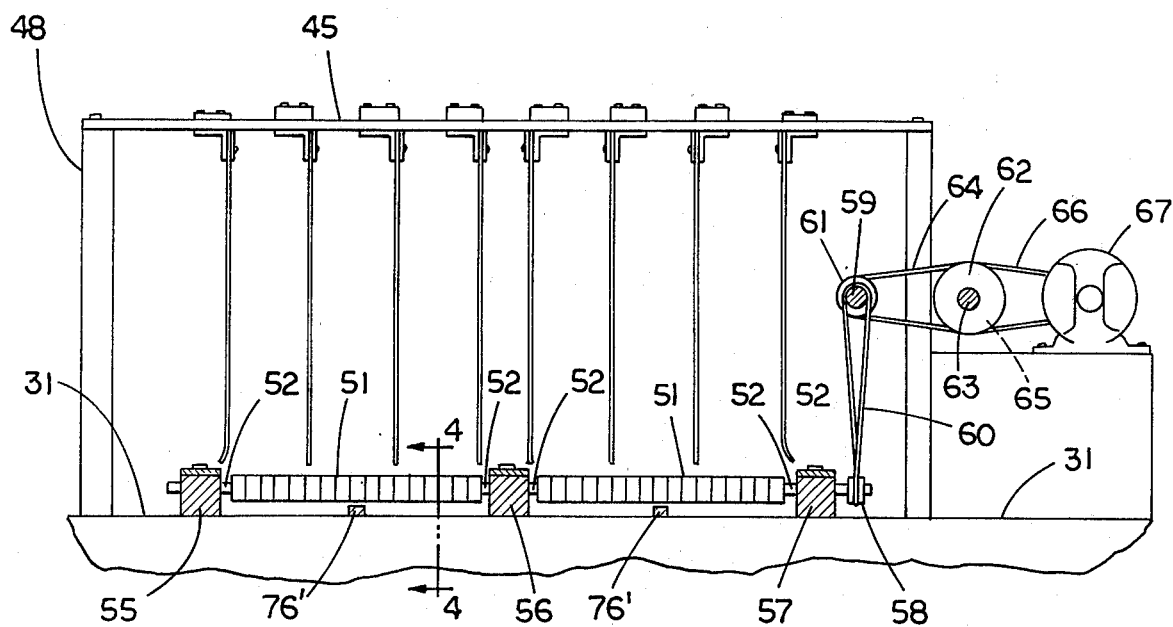
FIG. 3 is a fragmentary cross sectional view taken along the line 3—3 of FIG. 2 and viewed in the direction of the arrows.

In another embodiment, a stainless steel outer coating was provided on sleeve 53. Sleeve 53 is mounted on sleeve 54 in such a manner that relative motion therebetween is prevented. At least a portion of the interior surface of sleeve 54 contacts the outer surface of the drive shaft 52 so rotation of the drive shafts imparts rotation to the rollers. Rotation of drive shaft 52 will result in rotation of outer sleeve 53 thereby conveying an object such as a bottle or can. An increase of downward pressure on the rollers will result in the possible torque output increasing. However, substantial resistance to horizontal object movement will cause the rollers to slip on the drive shafts. Thus, if the moving bottles or objects become jammed, then rollers 51 will stop even though drive shafts 52 continue to rotate. In this same embodiment described, the length of each roller along its axis of rotation was approximately 7/16 inches. Shafts 52 are bearingly mounted to bars 55, 56 and 57 which are fixedly secured atop frame 31 (FIG. 3). Fixedly mounted at one end to each drive shaft is a pulley 58 which is drivingly connected to shaft 59 by belt 60. A pulley 61 is fixedly mounted to shaft 59 and is drivingly connected to pulley 62 on shaft 63 by belt 64. Another pulley 65 mounted to shaft 63 is drivingly connected by belt 66 to the rotatable output shaft of motor 67 mounted atop frame 31. The drive shaft of each row of rollers is provided with a pulley for engaging one of the belts 60 which extend over drive shafts 59 as shown in FIG. 2. Drive shafts 52 are perpendicular to shaft 59 and thus, belts 60 are toroidal belts with a separate belt provided for each shaft 52. Other types of drivers may be used in lieu of the belts and pulleys.

An apparatus not shown is provided to sequentially and evenly distribute the moving objects into rows 37 through 42. Such an apparatus is shown in U.S. Pat. No. 3,342,303 assigned to Shuttleworth Machinery Corp. Typically, an apparatus is utilized which forms a single row of objects moving over rollers 51 and then distributes a predetermined number of units from the single row sequentially into rows 37, 38 and 39. Likewise, a similar apparatus forming a single line of objects moving over rollers 51 distributes predetermined numbers of units sequentially into rows 40 through 42. Thus, since the objects moving over the rollers in group 33B are moving in a number of rows, such as six, whereas the objects moving in group 33A are moving only in one or two rows, it is desirable to drive rollers 50 of group 33B at a speed slower than rollers 51 of group 33A. Thus, a second shaft 68 (FIG. 2) is provided with belts 69 which drivingly engage the pulleys mounted to the drive shafts of rollers 50. Pulley 70 is mounted to shaft 68 and is drivingly connected by belt 71 to a pulley 72 mounted to shaft 63. Shaft 63 is coupled to shaft 59 by belt 64 and pulleys 61 and 62. Pulley 62 is of relatively large diameter whereas pulley 61 mounted to shaft 59 is of relatively small diameter. On the other hand, pulley 72 is of relatively small diameter whereas pulley 70 mounted to shaft 68 is of relatively large diameter. As a result drive shaft 59 is rotated at a faster speed than drive shaft 68 even though shaft 63 drives both shafts. Shaft 68 is rotatably mounted by bearings 73 secured by brackets 74 to posts 49. Likewise, shaft 59 is rotatably mounted by bearings 73 secured by brackets 74 mounted to posts 75 secured to frame 31. Shaft 63 is mounted in similar bearings 76 mounted atop frame 31.

In the event that a large load is placed on the rollers, the drive shafts upon which the rollers are mounted will bend downwardly. To prevent the drive shafts from becoming permanently deformed, a plurality of support bars 76' (FIGS. 3 and 4) are mounted atop frame 31 having top surfaces spaced from the bottom of a roller. In the above mentioned specific embodiment this spacing was approximately 3/32 inches and not greater than ⅛ inches. Bars 76' extend the length of the frame beneath rollers 50 and 51 and will contact some of the rollers as the drive shafts are bent downwardly. The rollers which contact bars 76' will stop; however, those rollers not contacting bars 76 will continue to rotate thereby moving the objects through the device.

Figure 7:
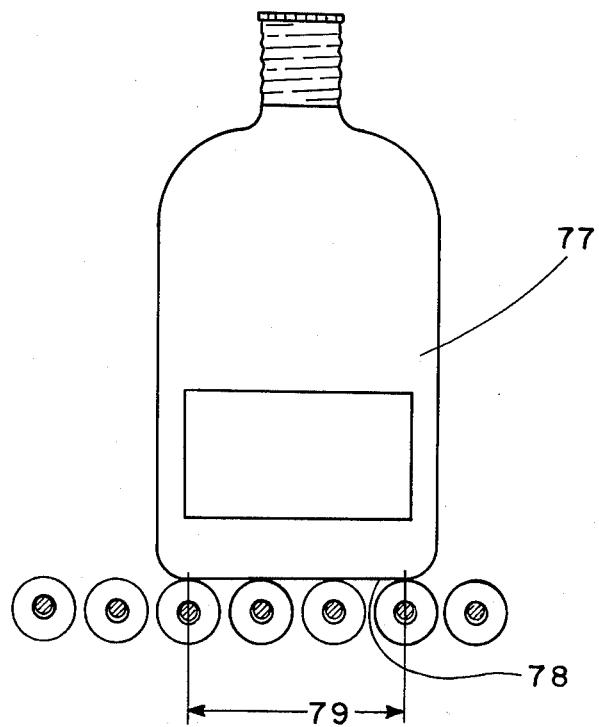
FIG. 7 is a view of a container positioned atop the rollers of the case packer.

It has been determined that the object being moved on the rollers should be supported at all times by at least three rollers (in the conveying direction) to prevent tilting of the objects. A typical object to be moved is shown in FIG. 7 as a bottle 77. It will be noted that the length of the flat bottom surface 78 of bottle 77 is denoted by dimension 79. It is very desirable that the spacing from the axis of one row of rollers to the axis of the adjacent row of rollers not exceed one-third the distance denoted by dimension 79 so as to provide at least three rows of rollers beneath the bottle at all times. Otherwise there may be a loss of stability of the bottle.

As discussed in U.S. Pat. No. 3,386,224, case packer 30 includes a pan 35 which moves horizontally to the left as viewed in FIG. 1 of this specification to the position indicated by the dashed line configuration 35'. The roller pan moves to the left after the objects thereon have been lifted by the vacuum head 34 so as to allow the vacuum head to pass downwardly to the case.

Figure 5:
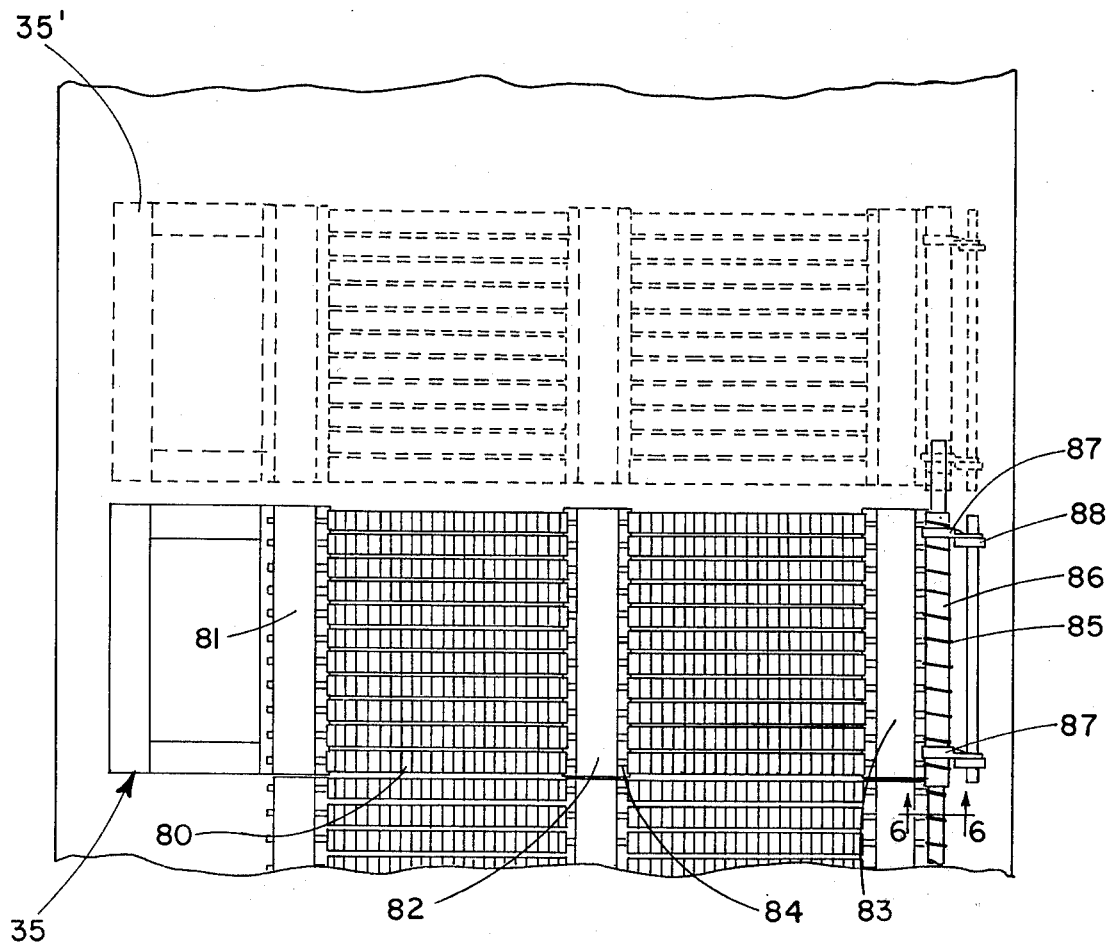
FIG. 5 is an enlarged fragmentary view of the roller pan shown in FIG. 1 taken along the line 5—5 and viewed in the direction of the arrows.
Figure 6:
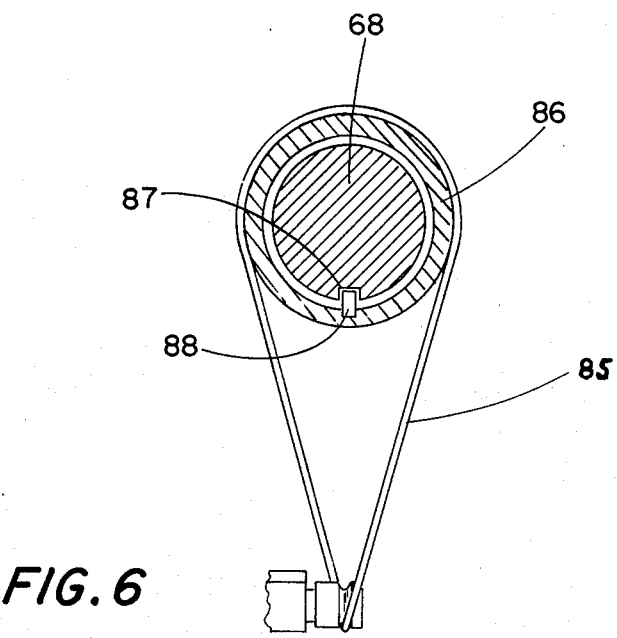
FIG. 6 is an enlarged cross sectional view taken along the line 6—6 of FIG. 5 and viewed in the direction of the arrows.

FIG. 5 is a fragmentary top view taken along the line 5—5 of FIG. 1 and viewed in the direction of the arrows showing roller pan 35. Roller pan 35 is provided with rows of rollers 80 which are identical to rollers 50 and 51. Rollers 80 are mounted to drive shafts 84 identical to drive shafts 52. The drive shafts having rollers 80 mounted thereon are bearingly received by bars 81, 82 and 83 fixedly mounted atop roller pan 35. Likewise, drive shafts 84 are provided with pulleys at their outer ends which engage belts 85 which extend over tube 86. Tube 86 is connected to shaft 68 and is rotatable therewith. A cross sectional view of tube 86 and shaft 68 is shown in FIG. 6. Shaft 68 is provided with a keyway 87 which receives key 88 mounted interiorly to and extending along the length of tube 86. Tube 86 is rotatably mounted by bearings 87 secured to posts 88 mounted to roller pan 35. Roller pan 35 is mounted in a manner identical to the mounting of platform or pan 205 of U.S. Pat. No. 3,386,224. A hydraulic cylinder is utilized to move roller pan 35 to the position indicated by the dashed lines in a manner identical to that described in the patent. Tube 86 is slidably mounted on shaft 68 with key 88 insuring that the tube and shaft rotate together. Thus, as pan 35 moves to position 35', tube 86 may telescopically extend on shaft 68 allowing the roller pan to move to and from position 35'. It is noted that shafts 59 and 68, and tube 86 are parallel to rod 63 and perpendicular (as viewed from above) to drive shafts 52.

Figure 8:
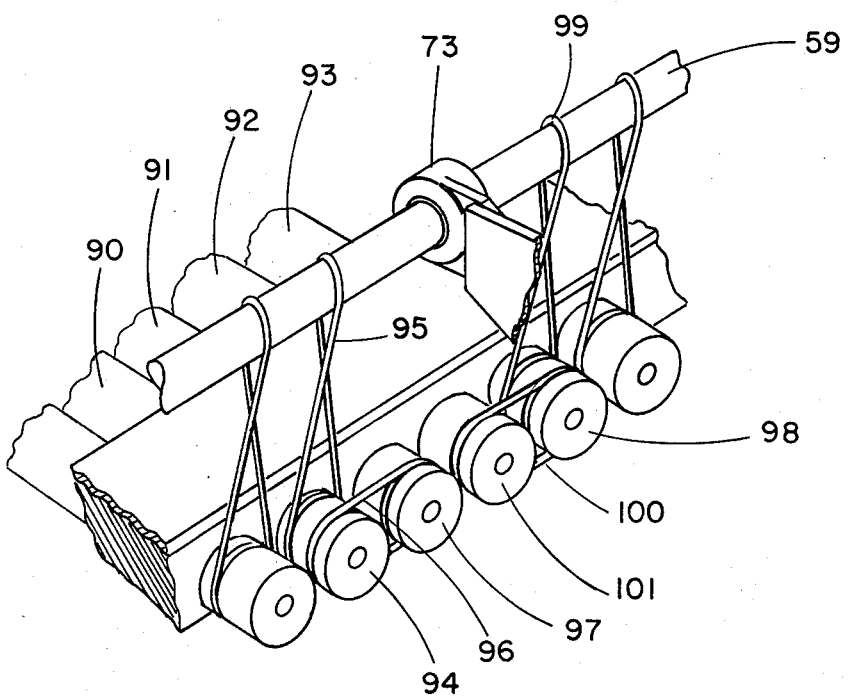
FIG. 8 is an enlarged fragmentary perspective view of the rollers immediately beneath bearing 73 of FIG. 2.

Shafts 59 and 68 (FIG. 2) and tube 86 (FIG. 5) are each rotatably supported in bearings. As a result, the belts for the row of rollers immediately beneath the shaft or bearings will not be able to extend around the shaft or tube without interferring with the bearings. FIG. 8 illustrates the arrangement of belts to circumvent this problem. Shown is shaft 59 rotatably supported by bearing 73. Four rows of rollers 90 through 93 are adjacent or beneath bearing 73. A double grooved pulley 94 is mounted to the end of the drive shaft of row 90 for engaging belt 95 mounted on shaft 59 and for also engaging a second belt 96 which connects pulley 94 to pulley 97 mounted to the drive shaft of row 91. Likewise, pulley 98 of row 93 is provided with a pair of grooves one of which engages belts 99 with the other groove engaging belt 100 which is received by pulley 101 of row 92. All of the belts in conveying means 33 are elastomeric belts.

It will be obvious from the above description that the present invention provides a conveying means which conveys the objects at different speeds along the length thereof. The conveying means allows the objects moved thereon to be stopped at one portion of the conveying means while the remaining objects located sidewardly thereof are conveyed. The rollers are especially quiet as compared with the prior art belts and rollers and in addition are of a sufficiently small size so as to eliminate the need for transfer plates typically used between the end of one conveyor and the start of a second conveyor.

The small rollers are particularly advantageous in conveying objects having beaded top edges. It has been determined that these objects will not tilt when they are conveyed by the rollers disclosed herein due to the low force applied. Tilting typically results when the containers are jammed together whereby the top beaded edges are contacted and the lower portion of the cans are similarly contacted thereby tilting the cans. A similar problem exists with tapered bottles and is also alleviated by the present invention.

Another advantage is the smooth acceleration or deceleration of the conveyed objects when moving from one set of rollers rotating at one speed to another set of rollers rotating at another speed. For example, when the conveyed object moves from group 33A to group 33B, (FIG. 2) the first rollers 50 engaged by the object will slip slightly on their drive shafts. As the object is conveyed further in group 33B, rollers 50 will slip less and less until the object is conveyed at the new speed.

A 90° corner assembly 110 (FIG. 9) is provided for moving the objects around a corner. Corner assembly 110 may be connected and aligned with another conveyor, such as one of the conveyors in FIG. 2. The moving objects may then subsequently pass into the three separate and parallel rows 40, 41 and 42 as previously described. Electrical motor 67 drives shaft 63 which in turn drives shaft 59 having belts 60 (FIG. 3) for driving the roller drive shafts 52. It is to be understood that while corner assembly 110 is shown aligned with the rollers for moving the objects into passageways 40 through 42, that the corner assembly may be aligned with other types of conveyors. In addition, a corner assembly may be provided for moving objects through an angle less than or greater than 90°.

Shaft 59' is mounted to frame 112 by bearing 113 and is arranged perpendicularly to shaft 111 mounted to frame 112 by bearing 114. Corner assembly 110 includes three groups of drive shafts and rollers. Groups 115 and 116 are driven by shaft 59' whereas group 117 is driven by shaft 111.

Bearing blocks 118, 119 and 120 are fixedly mounted to frame 112 and rotatably receive the roller drive shaft. Group 116 includes three drive shafts 121 through 123 with the opposite ends of the three drive shafts rotatably received in bearing block 118 and 120. Each drive shaft 121 through 123 includes a pulley wheel 125 engaged by belts 126 in turn driven by shaft 59'. Shaft 59' (FIG. 10) is driven by belts engaged with shaft 59 (FIG. 3). Likewise, pulley wheels 127 are mounted to drive shafts 128 of group 115 and receive belts 129 (FIG. 10) engaged by shaft 59'. Pulley wheels 127 may be press-fitted onto shafts 128. The drive shafts 128 of group 115 are rotatably mounted in bearing strip 130 and bearing blocks 119 and 120. Pulley wheels 131 are mounted to drive shafts 132 of group 117 and receive belts 133 driven by shaft 111. Shaft 111 is driven by belts engaged with another shaft driven by a suitable motor. Belts 126, 129 and 133 are identical with belts 60. Belts 129 and 133 are twisted through an angle of 90° due to the relative positions of the pulley wheels 127 and 131 with respect to drive shafts 59' and 111. Belts 126 are twisted through an angle of only 45° due to the relative positions of pulley wheels 125 and drive shaft 59'. Bearing strip 134 is provided to receive the outer ends of drive shafts 132 whereas the inner ends of drive shafts 132 are rotatably received in bearing blocks 119 and 120. The rollers 170 between group 115 and conveyor 171 are driven by shaft 59' whereas the rollers 172 between group 117 and conveyor 143 are driven by shaft 111.

Figure 9:
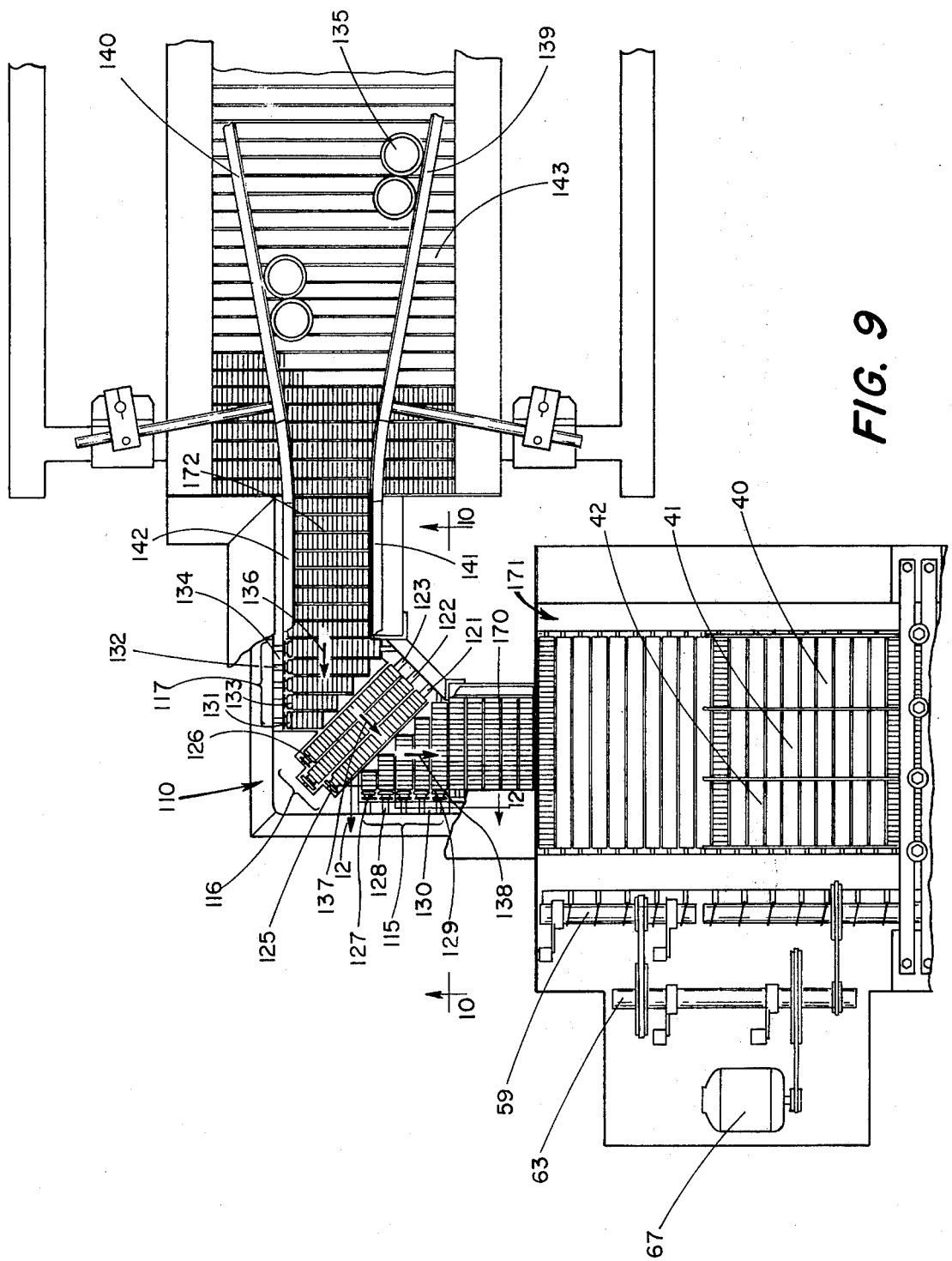
FIG. 9 is an enlarged fragmentary top view of a conveyor for moving objects through a corner with the conveyor attached to the conveyor shown in FIG. 2.
Figure 10:
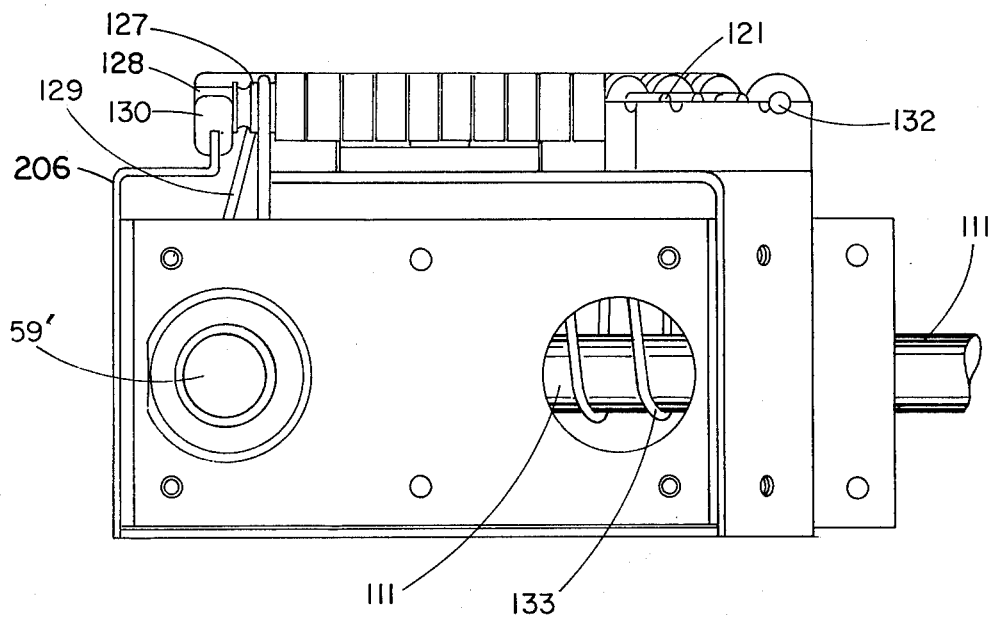
FIG. 10 is an enlarged cross sectional view taken along the line 10—10 of FIG. 9 and viewed in the direction of the arrows.
Figure 11:
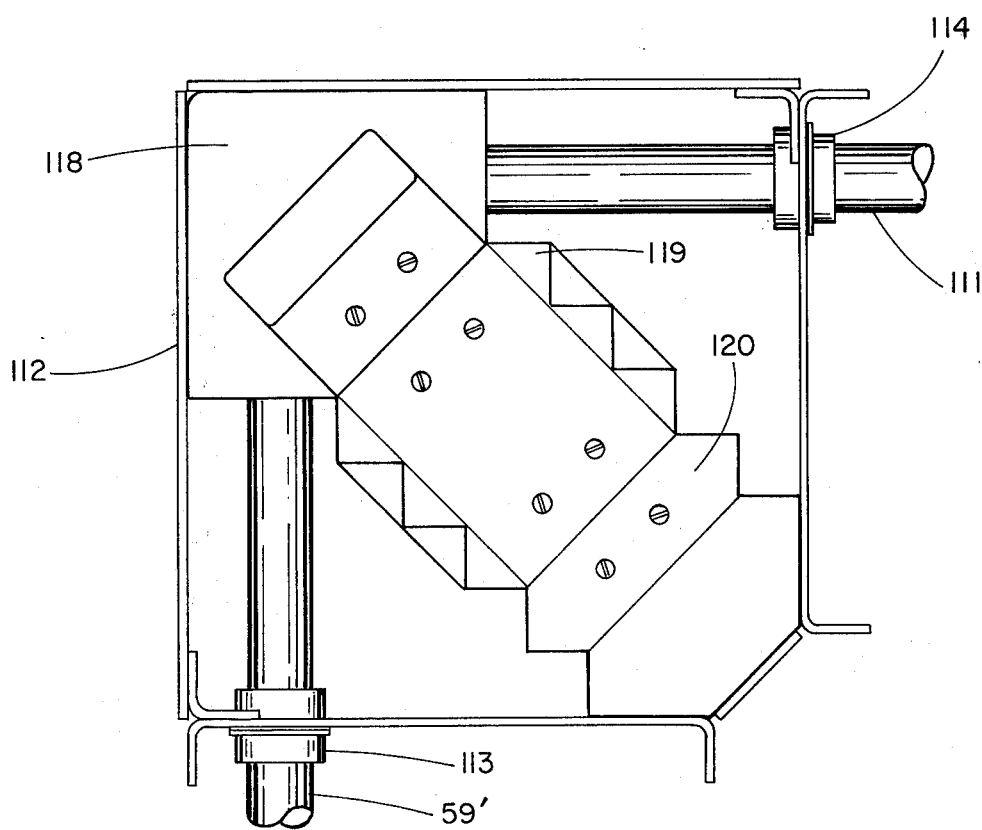
FIG. 11 is an enlarged top plan view of the corner conveyor shown in FIG. 9 but with the rollers and drive shafts removed therefrom.

As shown in FIG. 10, the top surfaces of bearing blocks 118, 119 and 120 along with the top surfaces of bearing strip 130 and 134 are flush with the uppermost surface of the rollers of groups 115 through 117. As a result, objects 135 (FIG. 9) will move across the top surfaces of the bearing blocks as the objects are moved through the corner in the direction of arrows 136, 137 and 138.

A pair of converging guide walls 139 and 140 are mounted to the frame of the conveyor forming an entrance through which objects 135 converge into a single file to pass through corner assembly 110. Walls 139 and 140 are aligned with walls 141 and 142 positioned at the opposite ends of the drive shafts of group 117 and the drive shafts having rollers 172 thereon. Walls 141 and 142 extend on the opposite sides of all of the drive shafts forming corner assembly 110 thereby limiting lateral movement of the objects off of the corner assembly. Conveyor 143 positioned beneath walls 139 and 140 is constructed in a manner similar to the groups of rollers 115 through 117. Conveyor 143 includes a plurality of rollers mounted to each drive shaft which in turn is driven by a suitable pulley/electrical motor arrangement.

Bearing strip 130 will now be described it being understood that a similar description applies to bearing strip 134. Strip 130 is mounted to frame 112 and has grooves 145 rotatably receiving and releasably holding roller shafts 128. Strip 130 is produced from a plastic material thereby providing a bearing surface for shafts 128. Shafts 128 snap into and out of grooves 145. The radius of each groove 145 is slightly greater than the radius of shafts 128; however, the grooves extend through an angle greater than 180° thereby extending above the center of each shaft 128.

Each roller 147 includes a hub 149 having a diameter less than the outside diameter of the roller but greater than the diameter of hole 148. Hubs 149 project laterally outward spacing each roller apart from each adjacent roller. Thus, sticking of adjacent rollers will be minimized since only a minimum of surface area of one roller is in contact with a minimum of surface area of an adjacent roller. In many cases, various liquids may accidentally spill on the rollers and flow downwardly between the rollers. Hubs 149 will allow the liquid to flow downwardly past the rollers and minimize the sticking of adjacent rollers. In one embodiment, the outside diameter of the rollers was 0.840 inches with the diameter of hole 148 being 0.328 inches and the diameter of hub 149 being 0.500 inches. In this same embodiment, the hub projected outwardly from both sides of the roller 0.007 inches.

The axes of rollers and drive shafts of each group shown in FIG. 9 are parallel with the axes of the remaining rollers and drive shafts in the same group. For example, the axes of drive shafts 128 are parallel in group 115 and are parallel with the axes of the rollers mounted thereon. Likewise, the axes of drive shafts 121 through 123 are parallel in group 116 and the axes of drive shafts 132 are parallel in group 117. Drive shafts 132 are perpendicularly arranged with respect to drive shafts 128 with drive shafts 121 through 123 being disposed therebetween at an angle of 45°. In the event that the objects are to be moved through an angle greater than or less than 90°, then the drive shafts of groups 115 through 117 are arranged to provide for the correct angle of movement.

Figure 15:
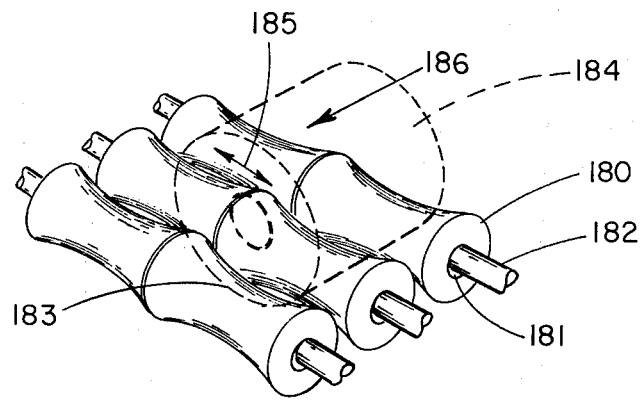
FIG. 15 is a fragmentary perspective view of an alternate embodiment of the rollers.

Shown in FIG. 15 is an alternate embodiment of the rollers. Roller 180 is identical to the other rollers disclosed herein in that hole 181 is larger than the diameter of shaft 182 allowing the roller to stop when sufficient external torque is applied to the roller even though shaft 182 continues to rotate. Roller 180 has a circular cross section with a decreasing radius from each end of the roller to midway between the ends of the roller providing a concave surface 183. The object 184 conveyed has a circular cross section thereby seating on concave surface 183 preventing lateral movement of object 184 in the direction of arrow 185 while the object is moved in the direction of arrow 186.

Figure 12:
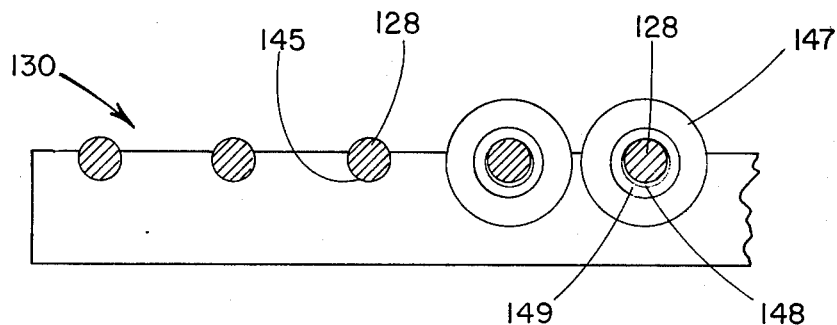
FIG. 12 is an enlarged cross sectional view taken along the line 12—12 of FIG. 9 and viewed in the direction of the arrows.
Figure 13:
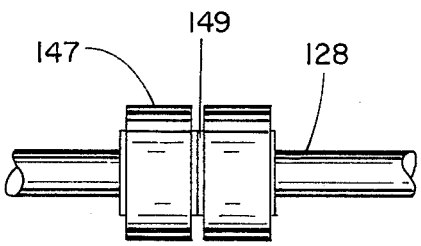
FIG. 13 is an enlarged top view of two of the rollers shown in FIG. 9 more clearly illustrating the spacing of the rollers.

All of the side-by-side rollers 180 on one of the drive shafts 182 are spaced apart from the side-by-side rollers on the other drive shafts 182. Similarly, all of the rollers 51 on one of the drive shafts 52 are spaced apart from the side-by-side rollers on the other drive shafts 52. The same is true of rollers 50 on their drive shafts 52 as well as all of the rollers disclosed herein. Considering, for example, FIG. 2, there is illustrated two rollers 51 which are opposite to one another; that is, one of the illustrated rollers is located directly across from the other roller 51. The spacing apart of the oppositely positioned rollers 51 in FIG. 2 (as well as the oppositely positioned rollers 50 and 51 in FIG. 2 as well as all of the oppositely positioned rollers 180 in FIG. 15, as well as the oppositely positioned rollers 147 in FIG. 12) is accomplished by making the distance between the axes of adjacent drive shafts 52 greater than the sum of the radius of any roller on one of the adjacent drive shafts and the radius of the roller opposite thereto on the other of the adjacent drive shafts.

Figure 16:
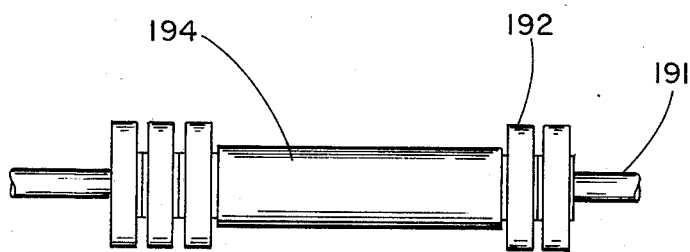
FIG. 16 is a fragmentary front view of rollers separated by a sleeve.

In many instances it is desirable to lift the conveyed objects off of the conveyor with a flight bar. Thus, it is necessary for the lifting apparatus to contact the bottom surface of the conveyed object. Sleeve 194 (FIG. 16) separates rollers 192 mounted to drive shaft 191. Sleeve 194 is of smaller diameter than rollers 192 thereby allowing the lifting apparatus to be positioned between the external surfaces of rollers 192 and radially outwardly of the external surface of sleeve 194.

The conveyors disclosed herein are particularly advantageous since the conveyors may be constructed to the appropriate width and length merely by adding or subtracting rollers and drive shafts. The corner assembly is particularly advantageous for moving objects around the corner without requiring any side guides or without requiring tapered rollers. The objects will readily move around a corner due to the orientation of the various rollers. The hubs spacing the rollers apart are particularly advantageous to prevent the rollers from sticking due to any wax or lacquer which passes between the rollers. In the event that a particular pair of rollers sticks together, the rollers can be relatively easily broken apart by rotating one relative to the other. The torque produced exerts a substantial force on the hubs of the stuck-together rollers breaking them apart. Torque is applied to the rollers as the drive shafts rotate thereby moving objects across the conveyor. In the event that the objects are stopped, then the rollers supporting the stopped objects will also stop and will slide relative to the drive shaft upon which they are mounted. Another advantage of the conveyor disclosed herein is the removable feature of the drive shafts mounted to the bearing strips. The conveyor is easily cleaned and maintained by merely snapping the drive shafts out of the bearing strips and removing the drive shafts and rollers from the conveyor.

Many variations are contemplated and included in the invention. For example, in one embodiment, the rollers positioned at the exit end of the conveyor were driven in a direction opposite the remaining rollers thereby providing deceleration of the moving objects. The roller may be produced from one material or a number of materials. As a result, the coefficient of friction for the outside surface of the rollers may be different than the coefficient of friction for the inside surface of the roller which contacts the drive shaft. By increasing the coefficient of friction on the outside surface of the roller, the rollers will more positively drive the moving objects and prevent the objects from slipping laterally or sideways across the rollers perpendicular to the direction of movement of the conveyor. Thus, the moving objects will remain in their original line of travel allowing multiple rows of moving objects without interference from one row to another row.

Figure 14:
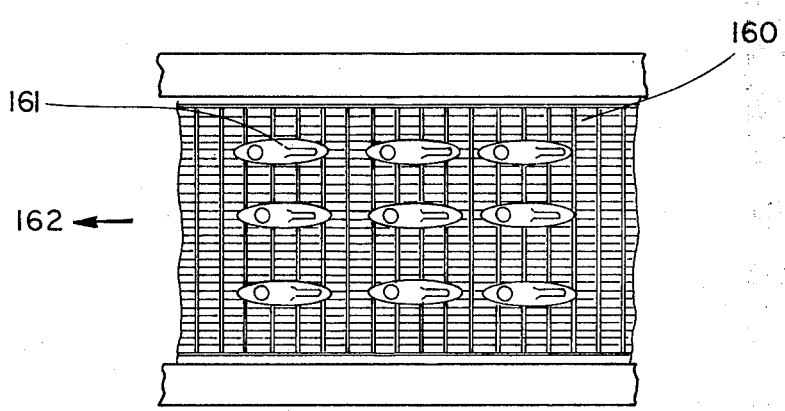
FIG. 14 is a fragmentary top view of a conveyor moving oblong objects.

In one embodiment, the inside surface of the roller was produced from Delrin which has a low coefficient of friction. Delrin is a trade name for a linear polyoxymethylene type resin, made by the polymerization of formaldehyde, whereas the outside surface of the roller was produced with a nitrile which has a higher coefficient of friction than Delrin. A higher coefficient of friction on the outside surface of the roller will also prevent the object from rotating as the object is conveyed along the conveyor. In certain instances, it is desirable to prevent rotation of the moving object. Oblong containers 161 are shown in FIG. 14 as being conveyed along conveyor 160 in the direction of arrow 162. It is desirable to prevent objects 161 from rotating so that their lengthwise dimension extends across the conveyor. By providing a high coefficient of friction on the outside surface of the conveyor rollers, the lengthwise dimension of each container will continue to point in the direction of arrow 162 as the objects are conveyed along the conveyor. In certain other instances, it is desired to provide considerable lateral movement of the objects being conveyed and as a result, a low coefficient of friction is provided on the outside surface of the roller. In this case, the entire roller may be produced from a single material such as Delrin. Many types of rubber materials may be utilized for covering the outside surface of the roller in order to obtain a high coefficient of friction. By providing a steel outer surface for the roller, the coefficient of friction for the outside surface is considerably reduced as compared to the rollers having rubber on the outside surfaces.

Excellent results have been achieved by producing the rollers from Valox material produced by Dupont. The material includes a normally smooth exterior surface with fiberglass strands embedded therebeneath. By grinding the exterior surface of the roller, the strands are exposed providing a high coefficient of friction for the external roller surface whereas the interior roller surface receiving the drive shaft has a low coefficient of friction since the interior surface is formed by molding. In order to obtain a low slip roller with a high coefficient of friction, the roller may be produced from polyterephthalate.

Figure 17:
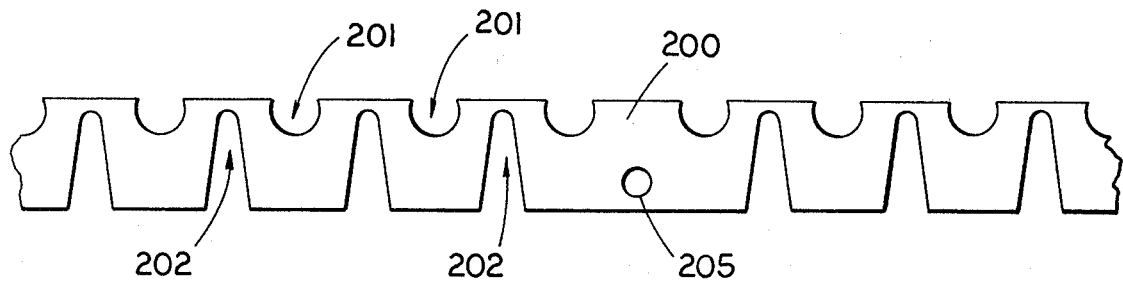
FIG. 17 is a fragmentary view similar to FIG. 12 of an alternative form of bearing strip.

In FIG. 17 there is illustrated an alternative form of bearing strip 200 which may be used in place of the bearing strip 130. The bearing strip 200 has grooves 201 which have a radius the same as bearing strip 130 and also extend through an angle greater than 180° the same as grooves 201. In one specific embodiment of the invention, the diameter of the grooves was 0.335 inches while the additional depth of the grooves 0.060 inches. Thus the total depth of the grooves was $$(.060'' + \frac{.335}{2}'').$$

Figure 18:
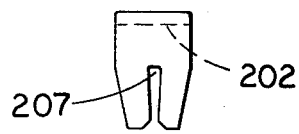
FIG. 18 is an end elevation of the structure illustrated in FIG. 17.

The bearing strip 200 differs from the bearing strip 130 in that expansion grooves 202 are provided to permit the plastic of the bearing strip to expand when the temperature changes. The grooves 202 extend through almost the entire thickness of the bearing strip 200 and are located between respective pairs of said plurality of grooves. The bearing strip 200 has a pin hole 205 which is used to pin the bearing strip to the frame member 206. In certain situations unless the grooves 202 are provided, the bearing strip will expand lengthwise to such a degree that it cannot be pinned to the frame member 206. FIG. 18 shows an end elevation of the structure of FIG. 17 and shows that the bearing strip includes a groove 207 which fits on the frame member 206.

Figure 19:
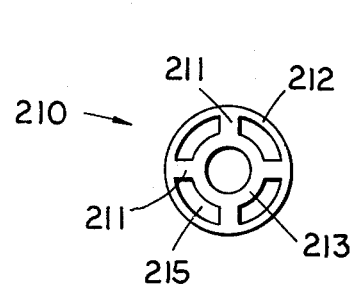
FIG. 19 is a side elevation of another roller embodiment.
Figure 20:
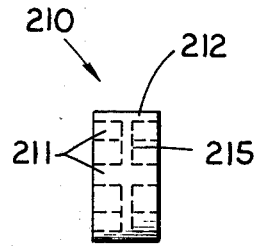
FIG. 20 is a top plan view of the structure of FIG. 19.

FIGS. 19 and 20 illustrate an alternative form of roller 210 which can be used to replace the rollers 51, for example, where it is desired that the rollers be lighter and include less mass to accelerate and decelerate. Also the roller of FIGS. 19 and 20 is easier cooled and includes fins 211 for transferring heat. The roller includes an outer cylinder 212 and an inner cylinder 213 which are connected by the fins 211 and also by a central radially extending rib 215.

Figure 22:
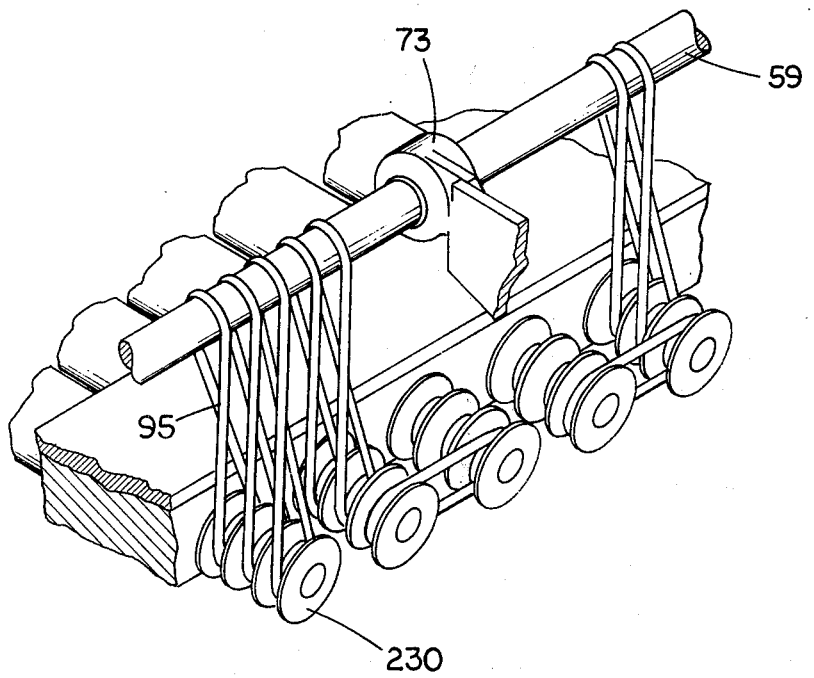
FIG. 22 is a view similar to FIG. 8 showing the alternative pulley in place.
Figure 21:
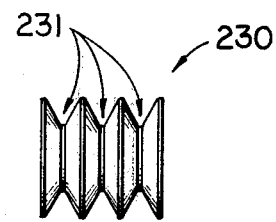
FIG. 21 is a side elevation of an alternative form of pulley.

In FIG. 21 a pulley 230 is illustrated which may be used to replace the pulley 94 for example of FIG. 8 where additional driving force is needed in the situation of interference described in connection with FIG. 8. The pulley of FIG. 21 is also useful where the shaft 52 or other shaft being driven is relatively long so that a substantial driving force is needed. See FIG. 22 wherein the pulley is used in place of pulley 94 but otherwise the structure is identical to the structure of FIG. 8 except for additional drive belts

The invention claimed is:

1. A conveyor for moving objects in multiple adjacent rows comprising:
 a frame;
 dividing means mounted on said frame defining a plurality of separate passageways each of which receives one of said rows of moving objects;
 a plurality of cylindrical drive shafts rotatably mounted on said frame and each having an outer surface with an outside diameter;
 a plurality of cylindrical rollers positioned in said passageways and mounted on each of said drive shafts in side-by-side relation, said rollers having cylindrical interior bearing surfaces of inside diameters enclosing said shafts, at least a portion of each of said interior surfaces contacting said outer surfaces whereby rotation of said shafts imparts rotation to said rollers, said inside diameters being greater than said outside diameters allowing said rollers in one of said passageways when exteriorly stopped to be stationary while said shafts rotate and said rollers in other passageways rotate;
 all of the side-by-side rollers on each respective drive shaft being spaced apart from the side-by-side rollers on the other drive shafts, said spacing being accomplished by making the distance between the axes of adjacent drive shafts greater than the sum of the radius of any roller on one of said adjacent drive shafts and the radius of the roller opposite thereto on the other of said adjacent drive shafts;
 said rollers projecting upwardly and being unobstructed to define a discontinuous supporting surface area for the moving objects, said discontinuous surface area extending other than vertically whereby gravity can hold the objects against said discontinuous surface area;
 a motor for causing said drive shafts to rotate; and,
 means connecting said drive shafts to an output of said motor.

2. The conveyor of claim 1 wherein:
 each shaft has a belt-receiving circumferential groove means at one end thereof;
 said motor has a rotatable output; and further comprising:
 a rotatably mounted first rod coupled to said output; and,
 a plurality of continuous drive belts engaged with said rod and at least some of said groove means to cause shaft and roller rotation when said rod rotates.

3. The conveyor of claim 2 wherein said groove means comprises:
 pulley wheels each having a circumferential groove therein and each mounted to said one end of each shaft.

4. The conveyor of claim 3 wherein:
 said discontinuous supporting surface area is horizontal.

5. The conveyor of claim 4 additionally comprising:
 a support beam mounted to said frame beneath but spaced from said rollers, said beam being spaced from said outer surface of at least one roller per drive shaft a distance not greater than 1/8 of an inch to support said roller as said drive shaft bows downwardly under a load, said beam being sufficiently narrow to support only a minor proportion of the rollers on each drive shaft whereby the major proportion of the rollers on each drive shaft are free to rotate when the drive shaft is bowed downwardly.

6. The conveyor of claim 1 wherein:
 each roller has an inner plastic sleeve fixedly mounted within an outer rubber cylinder.

7. A conveyor for moving objects in multiple adjacent rows comprising:
 a frame;
 dividing means mounted on said frame defining a plurality of separate passageways each of which receives one of said rows of moving objects;
 a plurality of cylindrical drive shafts rotatably mounted on said frame and each having an outer surface with an outside diameter;
 a plurality of cylindrical rollers positioned in said passageways and mounted on each of said drive shafts in side-by-side relation, said rollers having cylindrical interior bearing surfaces of inside diameters enclosing said shafts, at least a portion of each of said interior surfaces contacting said outer surfaces whereby rotation of said shafts imparts rotation to said rollers, said inside diameters being greater than said outside diameters allowing said rollers in one of said passageways when exteriorly stopped to be stationary while said shafts rotate and said rollers in other passageways rotate;
 said rollers projecting upwardly and being unobstructed to define a discontinuous supporting surface area for the moving objects, said discontinuous surface area extending other than vertically whereby gravity can hold the objects against said discontinuous surface area;
 a motor for causing said drive shafts to rotate;
 means connecting said drive shafts to an output of said motor;
 each shaft having a belt-receiving circumferential groove means at one end thereof;
 said motor having a rotatable output;
 a rotatably mounted first rod coupled to said output;
 a plurality of continuous drive belts engaged with said rod and at least some of said groove means to cause shaft and roller rotation when said rod rotates;
 a second rod rotatably mounted to said frame;
 a third rod rotatably mounted to said frame;

a plurality of pulleys and belts connecting said first rod and said second rod to said third rod, said third rod and said motor and said second rod to some of said drive shafts, said pulleys being of different sizes so said first rod and said second rod rotate at different speeds.

8. A conveyor for moving objects comprising:
a frame;
a plurality of cylindrical drive shafts rotatably mounted on said frame and each having an outer surface with an outside diameter;
a plurality of cylindrical rollers mounted on each of said drive shafts in side-by-side relation, said rollers having cylindrical interior bearing surfaces of inside diameters enclosing said shafts, at least a portion of each of said interior surfaces contacting said outer surfaces whereby rotation of said shafts imparts rotation to said rollers, said inside diameters being greater than said outside diameters allowing said rollers when exteriorly stopped to be stationary while said shafts rotate;
said rollers projecting upwardly and being unobstructed to define a discontinuous supporting surface area for the moving objects, said discontinuous surface area extending other than vertically whereby gravity can hold the objects against said discontinuous surface area;
a motor for causing said drive shafts to rotate;
means connecting said drive shafts to an output of said motor;
each shaft having a belt-receiving circumferential groove means at one end thereof;
said motor having a rotatable output;
a rotatably mounted first rod coupled to said output;
a plurality of continuous drive belts engaged with said rod and at least some of said groove means to cause shaft and roller rotation when said rod rotates;
pulley wheels each having a circumferential groove therein and each mounted to said one end of each shaft;
said discontinuous supporting surface area being horizontal;
a platform movably mounted on said frame;
a second rod rotatably mounted on said platform, said first rod and said second rod being telescopically connected together with said second rod extendable from said first rod and horizontally movable on said frame, said first rod and said second rod being connected together to prevent relative rotational motion therebetween; and wherein:
some of said drive shafts with some of said rollers being rotatably mounted on said platform and engaged by belts to said second rod.

9. The conveyor of claim 8 wherein:
said second rod is hollow and slidably receives said first rod, said first rod and said second rod including a key and a complementary sized keyway to prevent relative rotational movement therebetween.

10. The conveyor of claim 9 wherein:
said rollers engaged with said first rod are parallel with and convey objects to said rollers on said platform; and further comprising:
a box conveyor operable to carry boxes to a loading position beneath said platform;
lifting means mounted on said frame above said platform operable to lift said objects off said platform and down into said boxes; and,
means for moving said platform horizontally from a position adjacent said rollers connected to said first rod and a removed position where it is no longer under said lifting means.

11. A conveyor for moving objects comprising:
a. a plurality of parallel drive shafts;
b. a plurality of side-by-side rollers with inside diameters loosely received on each of said drive shafts, all of the side-by-side rollers on each respective drive shaft being spaced apart from the side-by-side rollers on the other drive shafts, said spacing being accomplished by making the distance between the axes of adjacent drive shafts greater than the sum of the radius of any roller on one of the said adjacent drive shafts and the radius of the roller opposite thereto on the other of said adjacent drive shafts, said rollers projecting upwardly and being unobstructed to define a discontinuous supporting surface area for the moving objects, said discontinuous surface area extending other than vertically whereby gravity can hold the objects against said discontinuous surface area;
c. and means coupled to said drive shafts for rotating said drive shafts, said drive shafts having outside diameters smaller than said inside diameters allowing some of said rollers on one of said shafts when exteriorly stopped to be stationary while said one shaft and remaining rollers on said one shaft rotate.

12. The conveyor of claim 11 wherein said means is coupled to said drive shafts by means arranged to drive at least one of said drive shafts at a speed different than the speed of at least one other of said drive shafts.

13. The conveyor of claim 11 wherein said means is coupled to said drive shafts by means arranged to drive some of said drive shafts at a speed different than the speed of others of said drive shafts.

14. The conveyor of claim 11 wherein said discontinuous supporting surface area is horizontal.

15. The conveyor of claim 11 wherein each roller has an inner sleeve fixedly mounted within an outer sleeve of different material than said inner sleeve.

16. The conveyor of claim 11 additionally comprising a support beam fixedly mounted beneath but spaced from said rollers;
each of said drive shafts being flexible;
said beam being closely spaced to the outer surface of at least one roller per drive shaft to support said roller as said flexible drive shaft bows downwardly under a load, said beam being sufficiently narrow to support only a minor proportion of the rollers on each drive shaft whereby the major proportion of the rollers on each drive shaft are free to rotate when the drive shaft is bowed downwardly.

17. The conveyor of claim 11 additionally comprising:
a support beam to rotatably support said shafts, said beam including a plurality of grooves into which said drive shafts are snap-fitted with each drive shaft freely rotatable in one of said grooves.

18. The conveyor of claim 17 wherein:
said drive shafts and said rollers are arranged in a plurality of groups with all of said drive shafts and said rollers in each group being parallel relative to the other rollers in that group but at an angle relative to the rollers in other groups.

19. The conveyor of claim 18 wherein:

said plurality of groups includes a first group of parallel drive shafts and rollers perpendicularly arranged with respect to a second group of parallel drive shafts and rollers and with a third group of parallel drive shafts and rollers disposed therebetween at an angle of 45° with respect to said first group and said second group to convey objects from said first group to said second group.

20. The conveyor of claim 19 and further comprising:

a pair of spaced apart walls positioned at opposite ends of said drive shaft to prevent movement of said objects off of said rollers.

21. The conveyor of claim 20 and further comprising:

a pair of converging guide walls aligned with said spaced apart walls forming an entrance through which said objects pass to said group of rollers.

22. The conveyor of claim 11 wherein:

at least some of said rollers each include an outside diameter, an inside diameter and a hub thereon of diameter larger than said inside diameter and smaller than said outside diameter, said hub projecting laterally outwardly spacing said rollers apart.

23. The conveyor of claim 11 wherein:

said drive shafts and said rollers are arranged to move said objects around a corner.

24. The conveyor of claim 11 wherein:

each shaft has a belt-receiving circumferential groove means at one end thereof, said groove means including a pulley wheel having a plurality of circumferential grooves therein;

said means for rotating comprising a motor, said motor having a rotatable output;

a rotatably mounted first rod coupled to said output, and a plurality of continuous drive belts engaged with said rod and with said grooves to cause shaft and roller rotation when said rod rotates.

25. The conveyor of claim 11 wherein:

said rollers have concave outer surfaces.

26. The conveyor of claim 11 wherein:

each of the side-by-side rollers on each respective drive shaft are closely spaced to adjacent side-by-side rollers on the respective drive shaft.

27. The conveyor of claim 11 wherein:

the outside diameters of said drive shafts are only slightly smaller than the inside diameters of said rollers received thereon.

28. The conveyor of claim 27 wherein:

each of the side-by-side rollers on each respective drive shaft are closely spaced to adjacent side-by-side rollers on the respective drive shaft.

29. A conveyor for moving objects comprising:

a. a plurality of parallel drive shafts;

b. a plurality of side-by-side rollers with inside diameters loosely received on each of said drive shafts, said rollers projecting upwardly and being unobstructed to define a discontinuous supporting surface area for the moving objects, said discontinuous surface area extending other than vertically whereby gravity can hold the objects against said discontinuous surface area;

c. means coupled to said drive shafts for rotating said drive shafts, said drive shafts having outside diameters smaller than said inside diameters allowing some of said rollers on one of said shafts when exteriorly stopped to be stationary while said one shaft and remaining rollers on said one shaft rotate;

d. a support beam to rotatably support said shafts, said beam including a plurality of grooves into which said drive shafts are snap-fitted with each drive shaft freely rotatable in one of said grooves;

e. said beam being elongated and having a pair of faces, each of said plurality of grooves opening into one of said faces, said beam also having expansion grooves which extend through almost the entire thickness of said bearing strip and are located between respective pairs of said plurality of grooves.

30. A conveyor for moving objects comprising:

a. a plurality of parallel drive shafts;

b. a plurality of side-by-side rollers with inside diameters loosely received on each of said drive shafts, said rollers projecting upwardly and being unobstructed to define a discontinuous supporting surface area for the moving objects, said discontinuous surface area extending other than vertically whereby gravity can hold the objects against said discontinuous surface area;

c. means coupled to said drive shafts for rotating said drive shafts, said drive shafts having outside diameters smaller than said inside diameters allowing some of said rollers on one of said shafts when exteriorly stopped to be stationary while said one shaft and remaining rollers on said one shaft rotate;

d. and a sleeve mounted on at least one of said shafts between two of said rollers having an outside diameter less than the diameter of said rollers.

31. A telescopic conveyor for moving objects comprising:

a frame;

a first conveyor mounted on said frame;

a platform conveyor movably mounted on said frame;

a plurality of drive shafts each having an outer surface with an outside diameter, some of said shafts being rotatably mounted on said first conveyor and some of said shafts being rotatably mounted on said platform conveyor;

a plurality of rollers mounted on each of said shafts in side-by-side relation, said rollers having cylindrical interior bearing surfaces of inside diameters enclosing said shafts, at least a portion of each of said interior surfaces contacting said outer surfaces whereby rotation of said shafts imparts rotation to said rollers, said inside diameters being greater than said outside diameters allowing said rollers when exteriorly stopped to be stationary while said shafts rotate;

a first rod rotatably mounted to said first conveyor;

a second rod telescopically connected to said first rod and rotatably mounted to said platform conveyor, said first rod and said second rod being respectively engaged with said shafts on said first conveyor and said shafts on said platform conveyor; and, means engaged with second rod operable to rotate said second rod resulting in rotation of said shafts.

\* \* \* \* \*

UNITED STATES PATENT AND TRADEMARK OFFICE
CERTIFICATE OF CORRECTION

PATENT NO. : 3,951,255
DATED : April 20, 1976
INVENTOR(S) : James J. Shuttleworth and Carlton S. Sprague It is certified that error appears in the above—identified patent and that said Letters Patent are hereby corrected as shown below:

In column 11, line 23 insert the following:

--95. If necessary, pulleys identical to pulley 230 may be mounted on both ends of the shaft 52 so that, for example, six of the belts 85 or 95 are used to drive the single shaft 52 from the drive shaft 59. Of course, the pulley 230 includes three grooves 231 instead of the two grooves of the pulleys 94 and 96.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.--

Signed and Sealed this

Thirteenth Day of July 1976

[SEAL]

Attest:

RUTH C. MASON
Attesting Officer

C. MARSHALL DANN
Commissioner of Patents and Trademarks